Nov. 21, 1967   H. S. JACKSON ET AL   3,354,254
FAILURE DETECTOR FOR CONSUMABLE ELECTRODE FURNACES
Filed Sept. 15, 1964
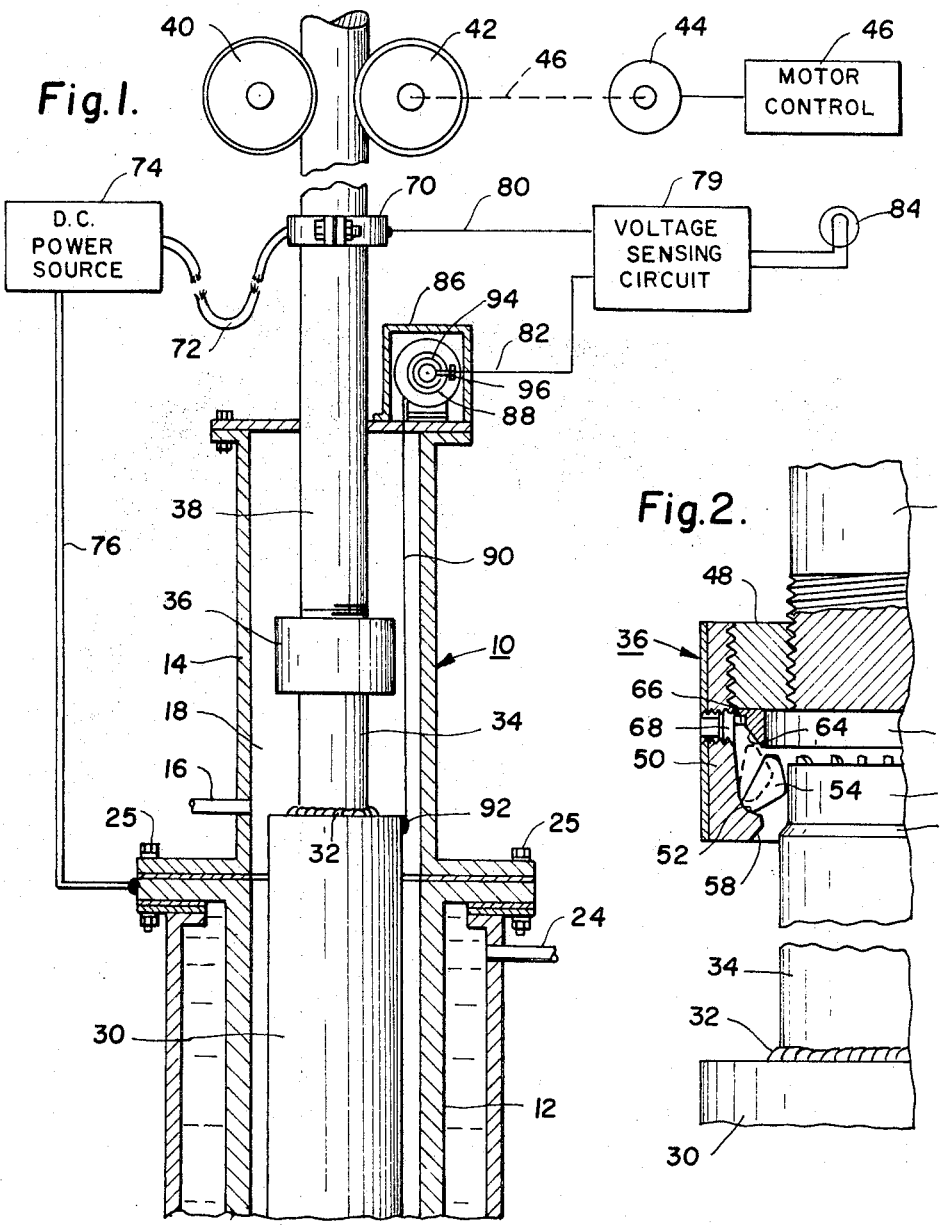
INVENTORS
HAROLD S. JACKSON and
JAMES B. MURTLAND, Jr.
BY
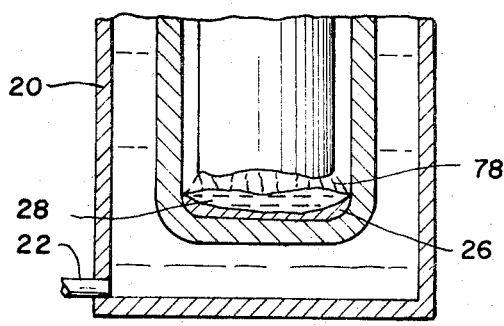
ATTORNEY United States Patent Office 3,354,254
Patented Nov. 21, 1967

3,354,254
FAILURE DETECTOR FOR CONSUMABLE ELECTRODE FURNACES
Harold S. Jackson, Troy, N.Y., and James B. Murtland, Jr., Natrona Heights, Pa., assignors to Allegheny Ludlum Steel Corporation, Brackenridge, Pa., a corporation of Pennsylvania
Filed Sept. 15, 1964, Ser. No. 396,513
6 Claims. (Cl. 13—9)

This invention relates to consumable electrode furnaces, and more particularly to means in a consumable electrode furnace for detecting and indicating a faulty connection of the electrode to the ram drive system.

As is known, consumable arc melting furnaces usually comprise an electrode of the metal to be melted extending downwardly into a mold or crucible which receives the molten metal and within which an ingot is formed. The electrode is connected to one terminal of a direct current voltage source, and means are provided for electrically connecting the other terminal of the source to the mold and, hence, to the molten metal. Usually, in starting the melt, a small supply of chips or the like is placed in the mold so that when the arc is struck the chips are melted to form an initial molten metal supply in the crucible mold. After the arc is initially struck, the arc is maintained between the electrode to be melted and the molten pool of metal beneath it, the electrode being melted due to the heat of the arc. As the electrode is melted, it is deposited in and forms the aforesaid molten pool, the bottom portion of which continuously solidifies as the electrode melts to form an ingot which increases in length, starting from the bottom upwardly. In this process, impurities float to and on the top of the molten pool; and assuming that the pool does not solidify during the formation of the ingot, the major portion of the impurities will be excluded from the main body of the ingot.

In the usual consumable electrode furnace, the electrode is attached by a clamp to a ram and drive arrangement therefor which will lower the electrode as it is being melted. The electrode is normally formed with a smaller diameter stub cast on, or welded to, one end of the main body of the electrode. The stub, in turn, is secured by the clamp to the lower end of the ram.

It sometimes happens that the stub is not properly connected to the clamp on the end of the ram, in which case arcing and excessive heat will occur, resulting in damage to the clamp. Furthermore, if the stub is welded to the electrode, and if the weld is improperly formed, arcing and heating at the weld will occur which may eventually result in dropping of the electrode into the ingot pool, in which case possible damage to the furnace and scrapping of the entire melt will ensue. Finally, damage to the ram can be produced by excessive internal heating and arcing due to bad internal connections in the ram.

As an overall object, therefore, the present invention seeks to provide apparatus for detecting faults of the type described above whereby the fault can be corrected without causing damage to the ram and its associated parts or possible scrapping of the entire melt.

More specifically, an object of the invention is to provide means for sensing an excessive rise in impedance and voltage between the connection of the arc voltage source to the ram and the electrode itself, which excessive rise in impedance and voltage indicates arcing and/or heating which can result in one of the failures enumerated above.

In accordance with the invention, a voltage sensitive circuit is connected between the electrode and the connection of the arc voltage source to the ram. Under normal operating conditions, the voltage existing between these two points will be relatively low since a direct electrical connection of low impedance is provided between the two. When, however, arcing or excessive heat occurs due to a bad stub weld, a poor clamp connection or other faulty connections within the ram, the impedance and voltage between the electrode and the ram will increase. This increase in voltage is then used to actuate an alarm which indicates the faulty condition whereby the operator can correct the fault before damage occurs.

The above and other objects and features of the invention will become apparent from the following detailed description taken in connection with the accompanying drawings which form a part of this specification, and in which:

FIGURE 1 is a schematic illustration of a consumable electrode furnace illustrating the operation of the present invention; and FIG. 2 is a partially broken-away cross-sectional view of the electrode clamp of the apparatus of FIG. 1 utilized to secure the consumable electrode to the lower end of the furnace ram.

With reference now to the drawings, and particularly to FIG. 1, a consumable electrode arc furnace is shown and identified generally by the reference numeral 10. The furnace comprises a conductive mold or crucible 12 which may, for example, be fabricated of copper. Covering the upper open end of the mold 12 is a gas-tight housing 14 having a connection at 16 to means, not shown, for evacuating the chamber 18 formed by the mold 12 and the housing 14 covering it. Alternatively, the chamber 18 could be filled with inert gas; however in either case the metal to be melted is protected from oxidation. Surrounding the mold 12 is a water jacket 20 having inlet and outlet ports 22 and 24 connected thereto. The water jacket 20 is secured to the mold 12 and housing 14 by means of circumferentially spaced bolts 25 and suitable gaskets, substantially as shown.

The mold 12 contains the ingot 26 (shown as it is initially formed) which solidifies from a molten pool 28 adjacent the lower end of an electrode 30 of the metal to be melted. The electrode 30 is welded as at 32 to a stub shaft 34. The stub shaft 34, in turn, is secured by means of a clamp 36, hereinafter described in detail, carried on the lower end of a vertically reciprocable ram 38. While the ram 38 may be reciprocated by any one of a number of different mechanical drives, the system herein illustrated comprises a pair of hourglass rolls 40 and 42, the roll 42 being connected to a drive motor 44 through linkage 46. The motor 44, in turn, is controlled by means of circuit 46 which may, for example, comprise the usual arc voltage control system wherein the ram 38 is raised or lowered as a function of the voltage existing across the arc between the bottom of electrode 30 and the molten pool 28. Alternatively, the motor 44 may be controlled as a function of voltage discontinuities superimposed on the base arc voltage as is more fully described in copending application Ser. No. 270,087, filed Apr. 2, 1963, now abandoned, and assigned to the assignee of the present application.

One type of clamp 36 which may be utilized to secure the stub 34 to the ram 38 is illustrated in detail in FIG. 2. It comprises an annular ring 48 threaded to the lower end of the ram 38. Threadedly received on the outer periphery of the ring 48 is an annular skirt portion 50 having formed on its lower edge a curved cam surface 52. Circumferentially spaced around the cam surface 52 are a plurality of lugs 54 arranged such that a reduced diameter portion 56 of the stub 34 may be inserted into the circular opening 58 at the bottom of skirt portion 50, thereby forcing the lugs 54 radially outwardly. When, however, the ram 38 is moved upwardly, or the electrode downwardly, the weight of the electrode 30 will cause the lugs 54 to effect a jamming and clamping action, thereby holding the electrode in place.

In order to remove the electrode from the clamp 36, the ram 38 is moved downwardly, or the electrode 30 upwardly, whereby the beveled surface 60 between reduced diameter portion 56 and the remainder of the stub 34 engages the lugs 54, thereby pushing them radially outwardly into approximately the dotted line positions shown in FIG. 2. Above the lugs 54 is a ring 62 having a beveled surface 64 thereon. Normally, the ring 62 is held in its elevated position shown in FIG. 2 by means of pins 66 mounted on eccentrics 68 threadedly received in the wall of the skirt portion 50. Upon rotation of the eccentrics 68, however, the ring 62 may be lowered with the stub 34 in a position whereby surface 60 moves the lugs 54 radially outwardly. In the lowered position of ring 62, the beveled surface 64 will engage the lugs to hold them in released position, thereby permitting removal of the stub 34. When the stub of a new electrode is inserted into opening 58, the ring 62 is moved upwardly by the eccentrics 68, whereupon the aforesaid clamping action can again be effected.

Further details of the clamp 36 may be had by reference to U.S. Patent No. 3,046,319; and while the clamp illustrated herein is particularly adapted for use with the invention, the invention is by no means limited thereto, it being understood that any type of suitable clamping means may be employed.

Surrounding the ram 38 is a ram clamp 70 connected through a first flexible cable or lead 72 to a source of direct current power 74. The other terminal of the power source 74 is connected through a cable or lead 76 as shown to the mold 12. Thus, upon the application of a direct current potential between the clamp 70 and the mold 12, an arc 78 is formed between the bottom of the electrode 30 and the molten pool 28.

As was mentioned above, it is the usual practice, in starting the melt, to place a small supply of chips or the like in the bottom of the mold 12 such that when the arc is struck the chips are melted to form an initial molten metal supply in the crucible mold. After the arc is initially struck, the arc is maintained between the electrode to be melted and the molten pool of metal beneath it, the electrode being melted due to he heat of the arc. As the electrode is melted, it is moved downwardly by motor 44 to maintain the desired arc gap.

As mentioned above, it sometimes happens that a poor weld 32 is produced between the stub 34 and electrode 30. If this occurs, arcing and excessive heating at the weld will occur; and if this condition is severe enough, the weld may actually break, resulting in dropping of the electrode into the pool 28. Also, damage may result to the clamp 36 as the result of excessive heat and arcing associated with poor contact between the stub and clamp. Finally, damage to the ram can be produced by excessive internal heating and arcing due to bad internal connections in the ram.

All of the foregoing undesirable conditions are accompanied by an increase in the impedance between the clamp 70 and the electrode 30, resulting in an increase in the voltage between these two points. Therefore, in accordance with the present invention, means are provided for sensing the voltage between the clamp 70 and electrode 30 and for actuating an alarm when the voltage between these two points exceeds a predetermined level indicative of arcing and/or excessive heating at the weld 32, within the clamp 36, or within the ram 38.

In accordance with this aspect of the invention, a voltage sensing circuit 79 is connected through leads 80 and 82 to the clamp 70 and electrode 30, respectively. The voltage sensing circuit may, for example, be a voltage sensitive relay, a bistable magnetic amplifier, or any other suitable device which changes states when the input voltage exceeds a predetermined magnitude. In the embodiment of the invention shown herein, the alarm device itself comprises an electric lamp 84; however this may be replaced by any suitable visual or audible alarm indicia.

Since the housing 14 is evacuated or filled with an inert gas, it is necessary to provide some means for connecting the lead 82 to the electrode 30 while maintaining the housing 14 sealed. To this end, there is provided a sealed reel housing 86 which is secured in sealed, communicating relation to the housing 14. The reel housing 86 has disposed therein a rotatable, spring-biased reel 88, electrically insulated from the housing, and on which a length of insulated wire 90 is spooled. The lower end of the wire 90 is welded or otherwise securely fastened to the upper end of the electrode as at 92. The end of the insulated wire on reel 88 may be connected, in accordance with procedures well known to those skilled in the art, to an annular strip of conducting material 94 which, in turn, makes contact with a stationary contact member 96 in a manner somewhat similar to a slip ring of an alternating current motor or generator. The contact 96, in turn, is connected through a seal in the wall of housing 88 to the lead 82. Thus, any increase in the voltage between the ram 38 and the electrode 30 indicative of a poor weld, poor clamping connection, or internal heating in the ram itself will be sensed as an increase in voltage by circuit 79 to actuate the alarm 84. The operator is then apprised of the condition and can correct it before further damage results.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In a consumable electrode furnace of the type in which an electrode is carried on the lower end of a vertically reciprocable ram, and wherein an arc is struck between the electrode and a molten pool of metal beneath it by electrically connecting two leads from an electrical power source to the ram and to a mold within which said molten pool is formed; the improvement of means for indicating an excessive rise in impedance between the lead connected to said ram and the electrode, comprising voltage sensitive circuit means connected between the electrode and the connection of said latter-mentioned lead to the ram, and alarm means connected to said circuit means and actuable when the voltage sensed by said circuit means rises above a predetermined level indicative of an excessive rise in impedance between said connection of the latter-mentioned lead to the ram and the electrode.

2. In a consumable electrode furnace of the type in which an arc is struck between a consumable electrode and a molten pool of metal beneath it by application of a direct current potential between the electrode and a mold within which the molten pool is formed, and wherein the electrode is welded to a metallic stub carried by and electrically connected to a clamp on the lower end of a verticaly reciprocable ram; the improvement of means for indicating failure of the weld between the stub and electrode as well as excessive heat and arcing between the clamp and stub, comprising voltage sensitive circuit means connected between the ram and electrode, and alarm means connected to said circuit means and actuable when the voltage sensed by said circuit means rises above a predetermined level indicative of arcing or overheating between the connections of the voltage sensitive means to the ram and electrode.

3. In a consumable electrode furnace of the type in which an arc is struck between a consumable electrode and a molten pool of metal beneath it by application of a direct current potential between the electrode and a mold within which the molten pool is formed, the electrode being welded to a metallic stub carried by and electrically connected to a clamp on the lower end of a vertically reciprocable ram, and wherein a direct current potential is applied between the electrode and the mold by leads connected to the ram and mold respectively; the improvement of means for indicating failure of the weld between the stub and electrode as well as excessive heat and arcing between the clamp and stub, comprising voltage sensitive circuit means connected between said electrode and the connection of said lead to the ram, and alarm means connected to said circuit means and actuable when the voltage sensed by said circuit means rises above a predetermined level indicative of arcing or overheating between the electrode and the connection of said lead to the ram.

4. In a consumable electrode furnace of the type in which an arc is struck between a consumable electrode and a molten pool of metal beneath it by application of a direct current potential between the electrode and a mold within which the molten pool is formed, and wherein the electrode is carried on the lower end of a vertically reciprocable ram by means of a clamp; the improvement of means for indicating excessive heat and arcing between the clamp and electrode, comprising voltage sensitive circuit means connected between the ram and electrode, and alarm means connected to said circuit means and actuable when the voltage sensed by said circuit means rises above a predetermined level indicative of damage to the electrode clamp caused by excessive heat and arcing associated with poor electrode contact.

5. In a consumable electrode furnace of the type in which an arc is struck between a consumable electrode and a molten pool of metal beneath it by application of a direct current potential between the electrode and a mold within which the molten pool is formed, and wherein the electrode is welded to a metallic stub connected to the lower end of a verticaly reciprocable ram; the improvement of means for indicating failure of the weld between the stub and electrode, comprising voltage sensitive circuit means connected between the ram and electrode, and alarm means connected to said circuit means and actuable when the voltage sensed by said circuit means rises above a predetermined level indicative of arcing and heating at the weld which can ultimately result in dropping of the electrode into said molten pool.

6. In a consumable electrode furnace of the type in which an arc is struck between a consumable electrode and a molten pool of metal beneath it by application of a direct current potential between the electrode and a mold within which the molten pool is formed, and wherein the electrode is carried on the lower end of a vertically reciprocable ram; the improvement of means for indicating an excessive rise in impedance between the ram and electrode, comprising voltage sensitive circuit means connected between the ram and electrode, and alarm means connected to said circuit means and actuable when the voltage sensed by said circuit means rises above a predetermined level.

References Cited
UNITED STATES PATENTS

| | | | |
|---|---|---|---|
| 2,895,104 | 7/1959 | Hansen et al. | 324—51 |
| 3,040,211 | 6/1962 | Caldwell | 317—2 |
| 3,187,159 | 6/1965 | Kilian | 13—9 |
| 3,192,474 | 6/1965 | Cherry | 324—65 |

BERNARD A. GILHEANY, *Primary Examiner.*

H. B. GILSON, *Assistant Examiner.*